United States Patent [19]

Tsuruta et al.

[11] Patent Number: 5,340,843
[45] Date of Patent: Aug. 23, 1994

[54] FLUORORESIN FOAM

[75] Inventors: Makoto Tsuruta, Tokorozawa; Ken Oda, Kamihukuoka, both of Japan

[73] Assignee: W. L. Gore & Associates, Inc., Newark, Del.

[21] Appl. No.: 26,133

[22] Filed: Feb. 22, 1993

[51] Int. Cl.$^5$ ............................................. C08J 9/14
[52] U.S. Cl. ................................ 521/79; 521/88; 521/94; 521/145
[58] Field of Search ................ 521/145, 94, 88, 79

[56] References Cited

U.S. PATENT DOCUMENTS 5,162,384  11/1992  Owens et al. ..................... 521/110

OTHER PUBLICATIONS

JP-A-59 033 707 (Sumitomo Elec. Ind. K. K.)-Abstract.

*Primary Examiner*—Morton Foelak
*Attorney, Agent, or Firm*—Gary A. Samuels

[57] ABSTRACT

Perfluorotripentylamine, perfluoropolyether or another such high-boiling liquid is added as a foaming agent to a thermoplastic fluororesin such as a tetrafluoroethylene-perfluoroalkyl vinyl ether copolymer resin or a tetrafluoroethylene-hexafluoropropylene copolymer resin. Because the vapor pressure of said foaming agent in the molten fluororesin is lower than that of Freon or another such low-boiling foaming agent, the cells in the foam can be made fine and uniform in diameter.

4 Claims, No Drawings

FLUORORESIN FOAM

FIELD OF THE INVENTION

The present invention relates to a foamed thermoplastic fluororesin insulating material.

BACKGROUND OF THE INVENTION

Compared with other macromolecular materials, fluororesins have lower dielectric constants, small dielectric tangents, and other excellent electrical characteristics. For this reason, fluororesins have been used in the past as dielectric materials, and have recently been made into foams in order to improve the electrical characteristics. Of these fluororesin materials, foams with closed-cell pore structures have recently attracted particular attention because of the advantage that such cells are crushed less readily than open cells.

In the past, fluororesin foams have been manufactured by methods in which a liquefied gas (e.g., hydrocarbon or fluorocarbon) is injected into a molten resin, and foaming is effected through the expansion of the gas contained in the resin as it emerges from the die. The reason that such methods have been adopted is that the molding temperature of a fluororesin is higher than that of an ordinary thermoplastic resin, so foaming cannot be accomplished using a thermally decomposable chemical foaming agent employed with such a thermoplastic resin.

However, the viscoelasticity of molten thermoplastic fluororesins is low and when a thermoplastic fluoropolymer resin foam is manufactured by extrusion molding, the gas that is formed by the decomposition of the foaming agent in the molten fluororesin causes rapid expansion due to the pressure difference with the atmosphere as the resin is extruded from the die orifice and released from the pressure that exists inside the extruder. As a result, the cells inside the fluororesin foam thus obtained are generally large, with an average diameter of approximately 150 micrometers or so, and the dispersion in the cell diameter is considerable. Thus, if such a fluororesin foam is used, for example, as an insulator for a thin insulated electrical wire, the cells will sometimes reach the outer surface of the insulator, making its surface rough or its outside diameter nonuniform, and causing the electrical characteristics to become nonuniform along the length of the electrical wire.

SUMMARY OF THE INVENTION

It has now been discovered that a foam with small, uniform closed cells can be obtained using a thermoplastic fluororesin and a foaming agent for which the melting point of the former and the boiling point of the latter lie within a predetermined range.

More specifically, the fluororesin foam of this invention is obtained by foaming a blend of a thermoplastic fluororesin and a foaming agent whose boiling point is lower than the melting point of said thermoplastic fluororesin but the difference between the two does not exceed 150° C.

DETAILED DESCRIPTION OF THE INVENTION

Preferably the thermoplastic fluororesins are thermoplastic copolymers of tetrafluoroethylene including tetrafluoroethylene-perfluoroalkyl vinyl ether copolymers (PFA; melting point: 300°–315° C.), tetrafluoroethylene-hexafluoropropylene copolymers (FEP; melting point: 260°–280° C.), and ethylene-tetrafluoroethylene copolymers (ETFE; melting point: 250°–280° C.). No particular restrictions are imposed on the compositions of said polymers. The melting point of a thermoplastic fluororesin referred to in the present invention is calculated from the highest temperature on a melting peak measured by the method defined in JIS K 7121-1987. In addition, no particular restrictions are imposed on the melt flow rate of the polymers, but a rate of 10 grams over a period of 10 minutes or more is preferable in order to attain high foaming and to obtain fine cells.

Perfluorotripentylamine (boiling point: 216° to 218° C.) and perfluoropolyether (boiling point: 215° C.) are two specific examples of foaming agents that are preferred from the standpoint of electrical characteristics of fluorine-based compounds and from other considerations, but the foaming agents are by no means limited to these examples. Hydrocarbons containing chlorine and other elements other than halogens, or polymers with a low degree of polymerization, such as silicone oil and fluorine oil, can also be used as long as their boiling points do not differ by more than 150° C. from the melting point of the thermoplastic fluororesin used.

The reason the difference between the boiling point of the foaming agent and the melting point of the thermoplastic fluororesin is set at no more than 150° C. is that when the difference exceeds 150° C., the cell diameters in the foam obtained become larger, dispersion increases dramatically at the same time, and high foaming becomes more difficult to accomplish.

It is not entirely understood why the foam pertaining to the present invention and having fine, uniform cells is obtained when a foaming agent and a thermoplastic fluororesin used are related to one another in the manner described above. However, the following can be surmised after various experiments are conducted.

The thermoplastic fluororesin, which serves as a base material with respect to the foaming agent, has a much higher melting point than do other resins, so its molding temperature is also very high. For example, in the case of extrusion molding, the temperature of the die and the temperature of each component inside the cylinder are usually set so that they range from a temperature slightly above the melting point of the fluororesin to a temperature approximately 100° C. higher. The boiling point of a conventionally used foaming agent is much lower. Therefore, when an attempt is made to obtain a foam by injecting such a low-boiling foaming agent into an extruder, said foaming agent is heated inside said extruder to a high temperature such as the one mentioned above, and the vapor pressure of said foaming agent thus rises appreciably. The result is that when the foaming agent is discharged from the die orifice together with the molten resin, and is no longer in the compressed state, said foaming agent undergoes rapid expansion due to such a large pressure difference. This is believed to enlarge the cell diameter of the foam thus obtained, and to increase the dispersion in cell diameters.

By contrast, with the present invention, the boiling point of the foaming agent used is higher than that of a conventional foaming agent to such an extent that the difference between said boiling point and the melting point of the thermoplastic fluororesin does not exceed 150° C., that is, the difference between the boiling point and the molding temperature is small than for conventional foaming agents, so the vapor pressure of the foaming agent inside the extruder is lowered correspondingly. This reduces the expansion pressure of the foaming agent contained in the molten resin as it is discharged from the die orifice, and results in smaller cell diameters for the foaming agent. Another advantage is that the low vapor pressure of the foaming agent in the extruder makes it possible to add large amounts of said foaming agent, and hence to obtain higher degrees of foaming than in the past.

EXAMPLES

The fluororesin foam pertaining to the present invention will now be described using specific examples, but the present invention is by no means limited to these practical examples.

PRACTICAL EXAMPLE 1

0.5 weight part of boron nitride was added per 100 weight parts of a thermoplastic fluororesin, a tetrafluoroethylene-perfluoroalkyl vinyl ether copolymer resin (melting point: 305° C.; melt flow rate: 13); the mixture was supplied into the hopper of an extruder; a foaming agent, perfluorotripentylamine (manufactured by Tokuyama Soda; Perfluodo IL-310; boiling point: 215° C.), was injected in an amount of 0.05 cc per 1 cc of the resin by means of a pump into the intermediate portion of the extruder; and the molten resin containing said foaming agent was extruded and applied along the outer periphery of a conductor with an outside diameter of 0.18 mm, yielding an insulating coating composed of a fluororesin foam with a thickness of 0.31 mm.

The extruder that was used in this process had a cylinder diameter of 30 mm and an L/D ratio of 30; extrusion molding was accomplished after setting the temperature of cylinder components at 310°–370° C., and the die temperature at 390° C.

PRACTICAL EXAMPLE 2

An insulating coating composed of a fluororesin foam was formed under conditions similar to those adopted in Practical Example 1 above, but the foaming agent used was a perfluorotrialklamine manufactured by Tokuyama Soda; (Perfluodo IL-260) with a boiling point of 160° C.

PRACTICAL EXAMPLE 3

An insulating coating composed of a fluororesin foam was formed under conditions similar to those adopted in Practical Example 1 above, but the foaming agent used was a perfluoropolyether {manufactured by Montedison; Gardon LS-215; boiling point: 215° C.).

PRACTICAL EXAMPLE 4

An insulating coating composed of a fluororesin foam was formed under conditions similar to those adopted in Practical Example I above, but the foaming agent used was a tetramethyl tetraphenyl trisiloxane (manufactured by Toray-Dow Corning Silicone; SH-704; boiling point: 215° C.).

PRACTICAL EXAMPLE 5

A foam was obtained by a method similar to the one described above, but the thermoplastic fluororesin used was a tetrafluoroethylene-hexafluoropropylene copolymer resin (melting point: 265° C.; melt flow rate: 7), and the extrusion conditions were set so that the cylinder temperature was 270°–400° C. and the die temperature was 380° C.

COMPARATIVE EXAMPLES 1 THROUGH 4

Freon 113 (trichlorotrifluoroethane; boiling point: 47.6° C.), Freon 111 (pentachlorofluoroethane; boiling point: 137° C.), and tetrachloroethane (boiling point: 146.3° C.) were used as the foaming agents for a tetraflurorethylene-perfluoroalkyl vinyl ether copolymer resin, which was foamed under conditions similar to those adopted in Practical Examples 1 through 4, yielding products pertaining to Comparative Examples 1 through 3. In Comparative Example 4, a foam was formed from Freon 121 {boiling point: 116.6° C.) and a tetrafluoroethylene-hexafluoropropylene copolymer resin (FEP; melting point: 265° C.).

The degree of foaming, the cell diameter, and the foaming condition were compared and assessed for each of the foams thus obtained. The results are shown in Table 1. The degree of foaming was expressed as a volumetric percentage of the foamed portions which was calculated from the formula "degree of foaming"$=P_n-P_f)/P_n)\times 100$, where $P_f$ is the specific gravity of the foam, and $P_n$ is the specific gravity of a non-foam. To obtain the cell diameter, cross sections of a foam-insulated electrical wire along a plane perpendicular to the wire's core were studied with a microscope, diameters of twenty or more randomly chosen cells were measured, and their average value was calculated. The foaming condition was assessed from the shape and distribution of the cells in the foam cross sections obtained during the cell diameter measurements.

As can be seen from the results in Table 1, each of the fluororesin foams pertaining to Practical Examples 1 through 4, in which PFA served as the base material, was a uniform material with a degree of foaming in excess of 80% and a cell diameter of 70 micrometers or less, while the fluororesin foams pertaining to Comparative Examples 1 through 3 foamed in a nonuniform manner and had large cells 90 to 120 micrometers in diameter, a low degree of foaming, and a wide distribution of said degree. Another disadvantage was that when FEP was used as the base material, uniform foams were obtained, but the cell diameter of the foam pertaining to Comparative Example 4 was considerably larger than those of the foams pertaining to the comparative examples.

In the practical examples described above, the fluororesin foam pertaining to the present invention was applied to an insulating coating for an electrical wire. However, said foam may also be used in sealing materials, heat-insulating materials, cushioning materials, high-frequency insulating materials, and the like, and can, depending on its application, be used in the shape of sheets, films, filaments, cylinders, bars, or the like.

Thus, the fluororesin foam pertaining to this invention can be made into a product with fine, uniform cells and with a high degree of foaming through the use of a foaming agent whose boiling point is higher than that of a foaming agent used with conventional fluororesin foams.

| | Fluororesin | Foaming agent | Degree of foaming | Cell diameter (μm) | Foaming condition |
|---|---|---|---|---|---|
| Practical Examples | | | | | |
| 1 | PFA (melting point: 305° C.) | Perfluorotripentylamine (melting point: 215° C.) | 85 | 50 | Uniform |
| 2 | PFA (melting point: 305° C.) | Perfluorotrialkylamine (melting point: 160° C.) | 85 | 70 | Uniform |
| 3 | PFA (melting point: 305° C.) | Perfluoropolyether (melting point: 215° C.) | 80 | 55 | Uniform |
| 4 | PFA (melting point: 305° C.) | Tetramethyl tetraphenyl trisiloxane (melting point: 215° C.) | 85 | 60 | Uniform |
| 5 | FEP (melting point: 265° C.) | Perfluorotripentylamine (melting point: 215° C.) | 75 | 40 | Uniform |
| Comparative Examples | | | | | |
| 1 | PFA (melting point: 305° C.) | Trichlorotrifluoroethane (melting point: 46.7° C.) | 55 | 120 | Nonuniform |
| 2 | PFA (melting point: 305° C.) | Pentachlorofluoroethane (melting point: 137° C.) | 60 | 100 | Nonuniform |
| 3 | PFA (melting point: 305° C.) | Tetrachloroethane (melting point: 146.3° C.) | 70 | 90 | Nonuniform |
| 4 | FEP (melting point: 265° C.) | Tetrachlorofluoroethane (melting point: 116.6° C.) | 70 | 80 | Uniform |

I claim:

1. A close-cell foam of a thermoplastic fluoropolymer prepared from a thermoplastic fluoro polymer resin and a foaming agent is selected from the class consisting of perfluorotripenylamine and perfluoropolyether in which the melting point of the resin is higher than the boiling point of the foaming agent and the two are within 150° C. of each other.

2. The foam of claim 1 in which the fluoropolymer is selected from the class consisting of thermoplastic copolymers of tetrafluoroethylene.

3. The foam of claim 2 in which the thermoplastic copolymers are selected from the class consisting of tetrafluoroethylene and perfluoroalkyl vinyl ether, tetrafluoroethylene and a copolymer of hexafluoropropylene, and tetrafluoroethylene and ethylene.

4. Process of foaming a thermoplastic fluoropolymer which comprises preparing a mixture of a thermoplastic fluoropolymer and a foaming agent is selected from the class consisting of perfluorotripenylamine and perfluoropolyether wherein the melting point of the fluoropolymer and the boiling point of the foaming agent are within 150° C. of each other, extruding the mixture through a die.

* * * * *